Sept. 2, 1969    J. R. MILLER III    3,464,270
Mc LEOD GAGE

Filed Oct. 17, 1967    2 Sheets-Sheet 1

James R. Miller, III
INVENTOR.

BY Harry M. Saragovitz
Edward J. Kelly
Herbert Berl
Harold W. Hilton

James R. Miller, III
INVENTOR.

United States Patent Office 3,464,270
Patented Sept. 2, 1969

3,464,270
McLEOD GAGE
James R. Miller III, Huntsville, Ala., assignor to the United States of America as represented by the Secretary of the Army
Filed Oct. 17, 1967, Ser. No. 676,393
Int. Cl. G01l 21/04
U.S. Cl. 73—400   7 Claims

ABSTRACT OF THE DISCLOSURE

An improved McLeod gage provided with a closed end capillary has a small cylindrical chamber formed therein. The cylindrical chamber communicates into an upper portion of a lower chamber. The upper portion of the lower chamber is provided with a parabolic configuration so that the upper portion will more nearly conform to the shape of the meniscus of the mercury which is used in the gage for vacuum measurements.

---

The invention described herein may be manufactured, used, and licensed by or for the Government for governmental purposes without the payment to me of any royalty thereon.

BACKGROUND OF THE INVENTION

Measurements at lower pressures and at greater accuracies are needed in many fields of vacuum science and technology. The greater understanding of the complicated dependence on pressure of electronic manometers demonstrates but one need for a measurement standard against which to check results. The McLeod gage has been found to be the best possible calibration standard because the pressure to be measured is related to the volumes of its bulbs and capillaries, and these can be measured with great accuracy.

The conventional gage has evolved to a point where its range is limited by the diameter of the compression capillary and the bulk of the mercury needed.

The best measurement accuracy, at low pressures, is presently limited by the fact that for two closely matched small diameter glass capillary tubes, such as found in a McLeod gage, a fickle difference in capillary depression can be significant. The variation of this difference constitutes a major source of error that prevents accurate measurements below approximately $10^{-5}$ torr.

A conventional McLeod gage was modified by a pair of German scientists to provide the gage known as the Moser and Poltz McLeod gage. This gage had a low pressure limit of approximately $1\times10^{-8}$ torr with an estimated accuracy of $\pm100\%$. Besides extending the range of the McLeod gage, the Moser and Poltz modification eliminated the effect of capillary depression variation on the gage, hence it may prove more accurate than a conventional McLeod gage in the measurement of higher pressures. Since the majority of vacuum gages in every day use are not true pressure instruments but respond to some quantity (heat conductivity of the gas, molecular density, etc.) proportional to pressure, this proportionality constant must be checked over a range of approximately $10^{-9}$ to $10^{-2}$ torr; therefore, the modification of Moser and Poltz seemed promising.

SUMMARY OF THE INVENTION

The present invention provides an improved McLeod gage including a closed end capillary having a small cylindrical cavity communicating into a lower chamber having a parabolic configuration at the upper portion thereof. The parabolic configuration substantially assumes the configuration of the meniscus and prevents occlusion of gas in the upper region of the lower chamber, i.e., the "shoulders" formed where the spherical configuration (of conventional gages) of the lower chamber mates with the upper cylindrical chamber. Thus, substantially all of the gas in the system using the improved McLeod gage is forced into the rather small upper cylindrical chamber to provide measurements indicative of the extent of pressurization of the system.

It is, therefore, an object of the present invention to provide a gage for accurately measuring ultra high vacuum.

It is another object of the present invention to provide an improved McLeod gage which is capable of measuring vacuum, with the elimination of capillary depression differences, beyond the range of existing McLeod gages.

It is another object of the present invention to provide an improved McLeod gage having a particular capillary configuration which permits the range of existing McLeod gage pressure measurements to be extended.

It is yet a further object of the present invention to provide such a capillary with a parabolic configuration closely approximating the shape of the meniscus of the active medium utilized in making vacuum measurements.

Other objects and advantages of the invention will become more readily apparent from the following detailed description taken in conjunction with the following drawings.

BRIEF DESCRIPTION OF THE DRAWINGS

As shown in FIGURE 1, a McLeod gage 10 is shown to include a first tubular member 12 connected to a mercury reservoir 14 and into a body member 16 at the lower surface 18 thereof. Member 12 includes an upstanding portion 20 extending into the interior of body 16. Body 16 includes an upper substantially spherical portion 22 having a capillary 24 mounted thereon and disposed in communication with the interior of the body. As shown in FIGURE 3, capillary 24 includes a lower chamber 25, which is disposed in communication with body 16, and an upper cylindrical chamber 27 having a small volume ($v$). The lower chamber includes an upper surface 29 having a parabolic configuration. A typical example of the parabolic configuration, defined by $y=Kx^2$, is illustrated in FIGURE 4 wherein one numerical division is taken to equal .005". This is only by way of example and is controlled by the size of the gage including the diameter of member 24.

Figures 1, 2:
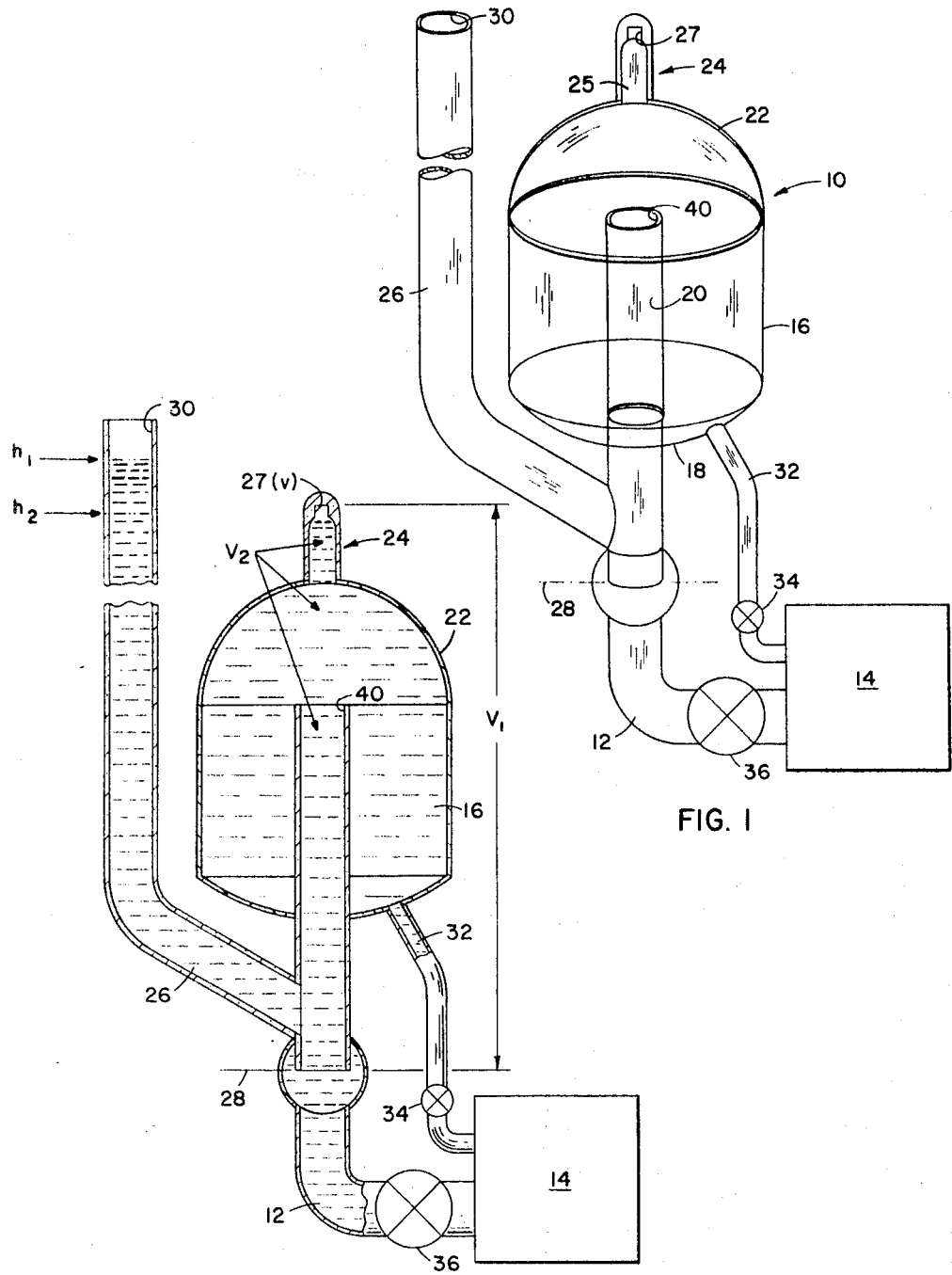
FIGURE 1 is a view of a McLeod gage utilizing the principals of the present invention.
FIGURE 2 is a sectional view of the gage shown in FIGURE 1.

To secure the gage to the pressure system to be measured and to provide means for making the measurements, an ascension tube 26 is secured to tubular member 12 in communication with the interior thereof, adjacent to the cut-off plane 28 and is disposed for connection at end 30 with the pressure vessel to be measured.

A conduit 32 is connected into body 16 and to the mercury reservoir 14 to direct mercury into the body. A valve 34 is mounted in conduit 32 to control the mercury flow to and from body 16. A second valve 36 is secured in tubular member 12 to control mercury flow therethrough.

In operation the gage is subjected to the pressure of the system to be measured by connecting end 30 thereto. Both valves 34 and 36 are then opened to admit mercury to compress any gases in body 16 and stand pipe 20 into capillary 24.

Figure 3:
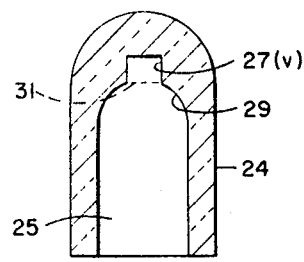
FIGURE 3 is an enlarged view of the upper end of the capillary as used in the device of FIGURE 1.

To assure that the mercury forms a plane surface across the base of cylindrical chamber 27, shown as a dotted line and denoted by number 31 in FIGURE 3, the mercury is first raised to form a concave surface therewith. When the mercury is gently lowered, it will form a plane and then a convex surface. By reflecting a light source onto a beam splitter (not shown), the plane surface can be detected by noting that there will be a greater width to the light reflected.

When the mercury has reached the plane position in the capillary it has compressed the gases into the top of tube 27 and has reached a position $h_1$ in ascension tube 26 (FIGURE 2). The height of the mercury, after it has reached the position designated as $h_1$, is measured by any of many conventional means, such as a cathetometer. The mercury is then lowered by opening valve 36 and the mercury will flow through stand pipe 20 and out of the ascension tube until it reaches a level just below cut-off 28. Valve 36 is then closed briefly for the system to stabilize. Mercury is retained in housing 16 at a level with an upper surface 40 of stand pipe 20. With valve 34 retained in closed position, valve 36 is then opened and the mercury level is raised to compress gases into the capillary again at which time the mercury will assume a level in ascension tube 26 as indicated by $h_2$. This height is measured, as by a cathetometer. The difference in height of the mercury is multiplied by the gage constant (K) to arrive at the pressure in the system, as follows:

$$P = K(h_1 - h_2)$$

where:

K = gage constant
$h_1$ = first mercury level in ascension tube
$h_2$ = second mercury level in ascension tube The value of K is derived from the equation $$v/(V_1 - V_2) = K$$

where:

v = volume of cylindrical chamber 27
$V_1$ = volume of the apparatus from the cut-off 28 to the top of chamber 27.
$V_2$ = volume of spherical upper portion 22, chambers 25 and 27 and standpipe 20 to the cut-off 28.

To make a very low pressure gage, v must be small and $V_1 - V_2$ very large. Some typical values for such a low pressure gage would be $v = -1 \times 10^{-5}$ cm.$^3$, $V_1 = 760$ cm.$^3$ and $V_2 = 165$ cm.$^3$. Such a gage has a low limit in the $10^{-9}$ torr range. These values are for illustrative purposes only, it is to be understood that the correct operation of this gage depends on the volume of the system to which it is attached and on the ratio of the volumes $V_2$ (portion 22) to $V_1$. Any modifications to change to different volumes would require consideration of the dependence of the operating equation on these factors in order to use the exact formula wherein:

$$P = K(h_1 - h_2)$$

It is to be understood that the mechanism for raising and lowering the mercury level may be accomplished in any of many conventional ways. For example, a diaphragm could be incorporated in the gage for displacing the mercury. The gage could be pressurized and depressurized for displacing the mercury, or mechanical hoists may be utilized for raising and lowering the mercury reservoir. In the event that the latter alternative is chosen the tubes connecting the reservoir to the gage would be flexible.

Figure 4:
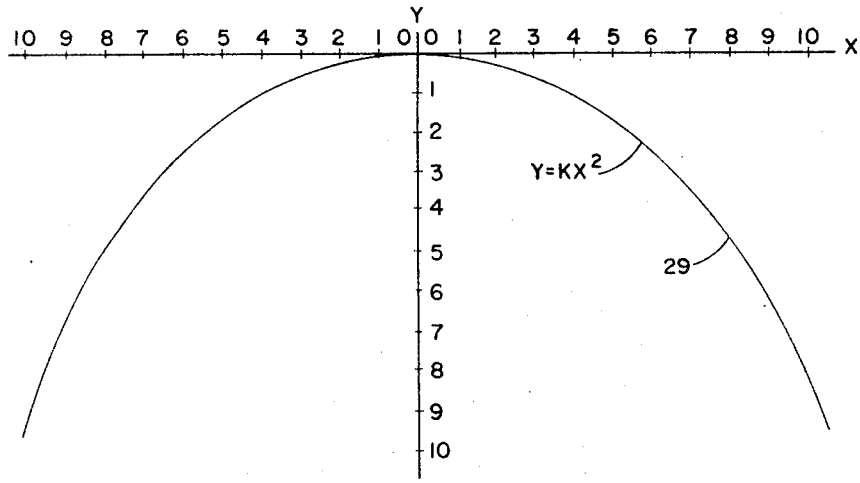
FIGURE 4 is a view of the parabolic configuration of the capillary of an improved gage.

To provide a very small movement of the mercury when it is desired to level the mercury across the bottom of the cylindrical chamber 27, an expansible bellows similar to that disclosed (FIGURES 4 and 5) in the "American Vacuum Society Proceedings," 1961, volume 2, page 1089, may be utilized.

Obviously, many modifications of the present invention may occur to one skilled in the art to which the invention pertains.

I claim:

1. A gage of the McLeod type comprising: a body connected to a source of liquid; a tubular member having a first portion extending into said body and a second portion extending out of said body and connected to said liquid; an ascension tube connected to said second portion and extending therefrom for connection to a pressure vessel; a capillary having an open end secured to the top of said body and a closed end providing an upper chamber, and a lower chamber disposed in communication with said body and said upper chamber, the upper portion of said lower chamber being provided with surfaces having a configuration corresponding to the configuration of the meniscus of a liquid therein to prevent occlusion of gases between said liquid and said surfaces due to admission of said liquid into said body and said capillary during a pressure measuring operation.

2. The device as set forth in claim 1 wherein said liquid is mercury.

3. The device as set forth in claim 2 wherein said surface of said lower chamber is of a substantially parabolic configuration matching the configuration of the meniscus of said mercury to prevent occlusion of gases therebetween.

4. A device as in claim 3 wherein said upper chamber is cylindrical.

5. A device as in claim 4 including a first conduit means secured to said body and said mercury reservoir; a second conduit secured to said second portion of said tubular member and said mercury reservoir; and, valve means secured in said first and second conduits for control of mercury flow therethrough.

6. A device as in claim 5 wherein said first portion of said tubular member extends a predetermined length into said body and terminates below said capillary.

7. A device as in claim 6 wherein said body is provided with an upper dome portion having a spherical configuration.

References Cited

UNITED STATES PATENTS 3,177,704 4/1965 Strange _____ 73—400 XR
3,417,622 12/1968 Gilmont _____ 73—400

DANIEL O. WOODIEL, Primary Examiner